(12) United States Patent
Yang

(10) Patent No.: US 7,142,184 B2
(45) Date of Patent: Nov. 28, 2006

(54) POLYSILICON THIN FILM TRANSISTOR LIQUID CRYSTAL DISPLAY HAVING A PLURALITY OF COMMON VOLTAGE DRIVERS

(75) Inventor: Chien-Sheng Yang, Taipei (TW)

(73) Assignee: AU Optronics Corp., Hsin-Chu (TW)

( * ) Notice: Subject to any disclaimer, the term of this patent is extended or adjusted under 35 U.S.C. 154(b) by 334 days.

(21) Appl. No.: 10/604,646

(22) Filed: Aug. 6, 2003

(65) Prior Publication Data

US 2004/0263459 A1 Dec. 30, 2004

(30) Foreign Application Priority Data

Jun. 26, 2003 (TW) ................. 92117490 A

(51) Int. Cl.
*G09G 3/36* (2006.01)
(52) U.S. Cl. .......................... 345/87; 345/100
(58) Field of Classification Search .................. 345/87, 345/88, 92, 93, 94, 95, 98, 99, 100, 103, 345/204, 84, 85, 90
See application file for complete search history.

(56) References Cited

U.S. PATENT DOCUMENTS

| | | | | |
|---|---|---|---|---|
| 5,825,341 A | * | 10/1998 | Pawlowski | 345/87 |
| 6,057,819 A | * | 5/2000 | Sone et al. | 345/96 |
| 6,130,657 A | * | 10/2000 | Kurokawa et al. | 345/100 |
| 6,225,967 B1 | * | 5/2001 | Hebiguchi | 345/88 |
| 6,762,565 B1 | * | 7/2004 | Kudo et al. | 315/169.2 |
| 6,791,523 B1 | | 9/2004 | Fujita et al. | |
| 2001/0011984 A1 | | 8/2001 | Hong | |
| 2002/0011984 A1 | * | 1/2002 | Shirochi et al. | 345/96 |

FOREIGN PATENT DOCUMENTS

| | | |
|---|---|---|
| CN | 1294701 A | 5/2001 |
| CN | 1321261 A | 11/2001 |
| CN | 1335589 A | 2/2002 |
| JP | 08-227068 | 9/1996 |
| JP | 2001-094053 | 4/2001 |

* cited by examiner

*Primary Examiner*—Bipin Shalwala
*Assistant Examiner*—Nitin Patel
(74) *Attorney, Agent, or Firm*—Winston Hsu

(57) ABSTRACT

A polysilicon thin film transistor liquid crystal display (polysilicon TFT LCD) has a panel, a common voltage layer, a plurality of display cells, a plurality of scan lines, a plurality data lines, and a plurality common voltage drivers. The scan lines and the data lines are coupled to the display cells. Each of the common voltage drivers is formed in the panel and is used to generate a common voltage and to apply the common voltage to the common voltage layer.

5 Claims, 9 Drawing Sheets

POLYSILICON THIN FILM TRANSISTOR LIQUID CRYSTAL DISPLAY HAVING A PLURALITY OF COMMON VOLTAGE DRIVERS

BACKGROUND OF INVENTION

1. Field of the Invention

The present invention relates to a polysilicon thin film transistor liquid crystal display (polysilicon TFT LCD), and more particularly, to a polysilicon thin film transistor liquid crystal display having a plurality of common voltage drivers.

2. Description of the Prior Art

Liquid crystal displays (LCDs) have been widely applied to a variety of information products, such as notebook computers and PDAs, because of their small size, low power consumption, and low radiation emission. Liquid crystal molecules are characterized by being capable of allowing different amounts of light to pass according to their rotation angles. Consequently, a liquid crystal display is able to generate rich and colorful images.

Currently, most LCDs are fabricated by an amorphous silicon thin film transistor process, and drivers for controlling the LCD are produced in the form of external ICs connected to the LCD panel. Nevertheless, as technological improvements are made, more and more LCDs are fabricated by polysilicon thin film transistor processes, which result in better display effects (e.g. higher resolution). In addition, related drivers and interface circuits are also integrated into the panel in the form of polysilicon thin film transistors so that the production cost is substantially reduced.

Generally speaking, the above-mentioned integrated polysilicon TFT LCD comprises a common voltage driver. The common voltage driver is normally a voltage follower having an operational amplifier. The conventional polysilicon TFT LCD has only one single voltage follower functioning as a common voltage driver. However, it is easy for the panel to have a non-uniform common voltage distribution because of the resistance-capacitance (RC) impedance of the common electrode conductive wires. This non-uniform distribution of the common voltage leads to poor display qualities. Refer to FIG. 1, which is a schematic diagram of a conventional polysilicon thin film transistor liquid crystal display 10. The polysilicon thin film transistor liquid crystal display 10 comprises a panel 12 having related drivers and interface circuits formed therein. The polysilicon thin film transistor liquid crystal display 10 further comprises a pixel region 14, a first data line driver 16A, a second data line driver 16B, a scan line driver 18, a common voltage driver 20, a timing control circuit 22, and an interface circuit 24. The pixel region 14, the first data line driver 16A, the second data line driver 16B, the scan line driver 18, the common voltage driver 20, the timing control circuit 22, and the interface circuit 24 are formed in the panel 12 in the form of polysilicon thin film transistors.

As shown in FIG. 1, an image signal is first transmitted to the polysilicon thin film transistor liquid crystal display 10, and transferred to related logic circuits such that corresponding images are displayed in the pixel region 14. The pixel region 14 comprises a plurality of display cells, each display cell being a pixel or a sub-pixel and driven by the first data line driver 16A, the second data line driver 16B, and the scan line driver 18. In addition, the timing control circuit 22 generates a timing signal for operating the first data line driver 16A, the second data line driver 16B, the scan line driver 18, and the interface circuit 24. The common voltage driver 20 is for providing a common voltage. However, due to the resistance-capacitance impedance of the conductive wires, non-uniform common voltage distribution readily occurs in the conventional polysilicon thin film transistor liquid crystal display 10.

Refer to FIG. 2, which is a timing diagram of common voltage Vcom of the polysilicon thin film transistor liquid crystal display panel 10 shown in FIG. 1. FIG. 2 illustrates the waveform of the common voltage Vcom of the common voltage driver 20 at the common voltage driver 20, point "A", and point "B" of the pixel region 14 shown in FIG. 1 respectively from top to bottom. As shown in FIG. 2, the common voltage Vcom is an alternating voltage, and therefore applied to the common electrode of each display cell by means of swing. However, since the lengths from the common voltage driver 20 to point "A" and to point "B" are not equal, and the resistance-capacitance effect is not negligible, the common voltage Vcom at point "A" and point "B" are delayed and decayed compared to the common voltage Vcom in the common voltage driver 20. When the delay or decay makes the phase and amplitude difference of Vcom at point "A" and point "B" too large, display quality of the polysilicon thin film transistor liquid crystal display is deteriorated.

SUMMARY OF INVENTION

It is therefore an object of the present invention to provide a polysilicon thin film transistor liquid crystal display having a plurality of common voltage drivers for solving the prior art problem.

According to the present invention, a polysilicon thin film transistor liquid crystal display is disclosed. The polysilicon thin film transistor liquid crystal display comprises a panel, a common voltage layer, a plurality of display cells, a plurality of scan lines, a plurality of data lines, and a plurality of common voltage drivers. The scan lines and data lines are connected to the display cells. Each common voltage driver is formed in the panel for generating a common voltage applied to the common voltage layer.

It is an advantage of the present invention that a plurality of common voltage drivers are positioned in diverse locations of the panel, and thus, the common voltage provided by the common voltage drivers is equally applied to the common electrode of each display cell.

These and other objects of the present invention will be apparent to those of ordinary skill in the art after having read the following detailed description of the preferred embodiment that is illustrated in the various figures and drawings.

DETAILED DESCRIPTION

Figure 1:
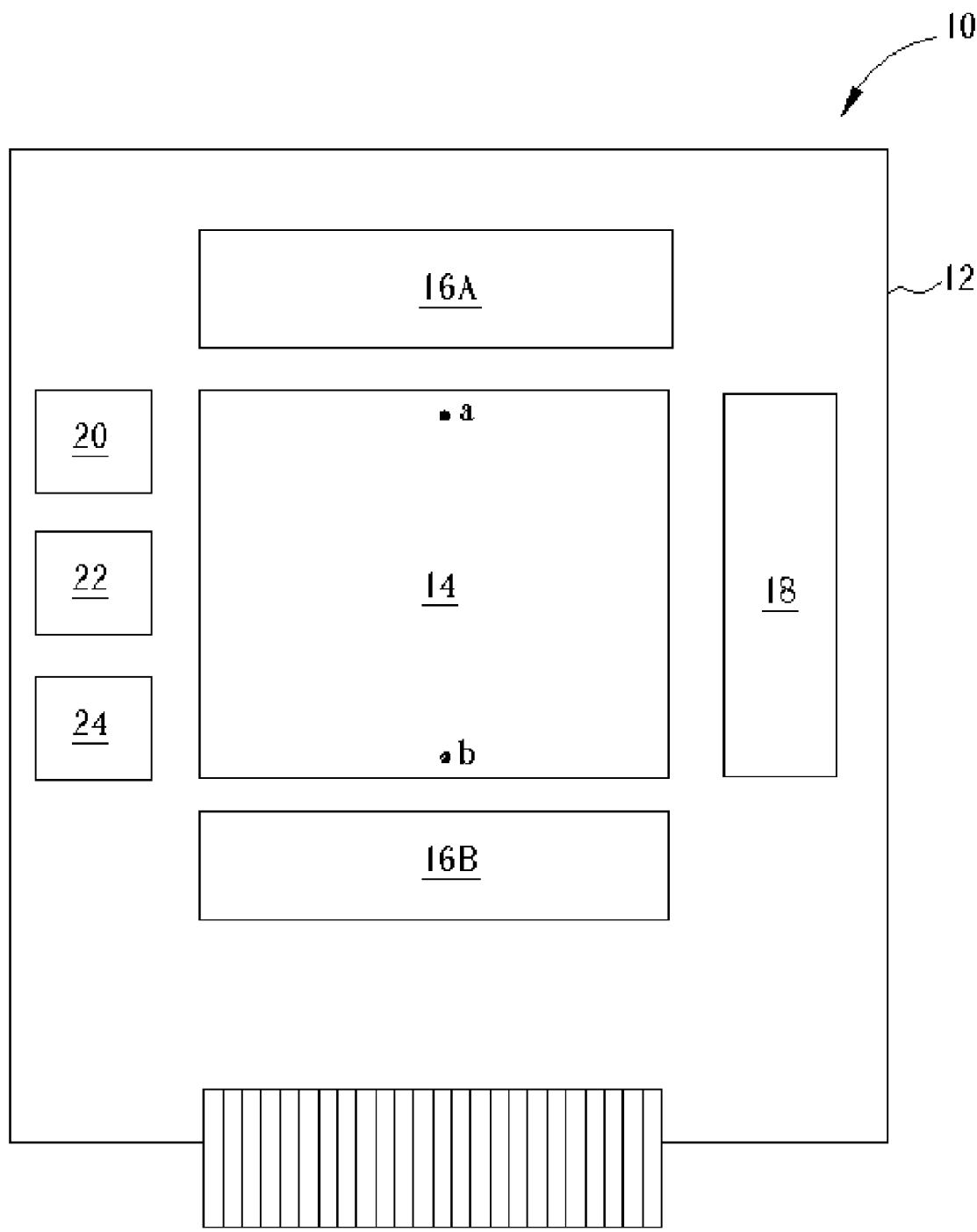
FIG. 1 is a schematic diagram of a conventional polysilicon thin film transistor liquid crystal display.
Figure 2:
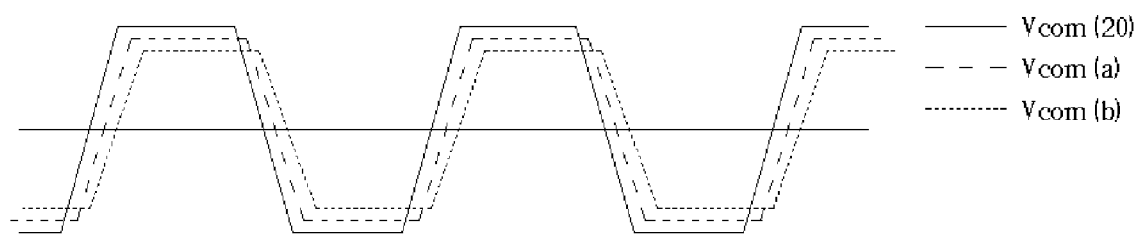
FIG. 2 is a timing diagram of a common voltage Vcom of the polysilicon thin film transistor liquid crystal display shown in FIG. 1.
Figure 3:
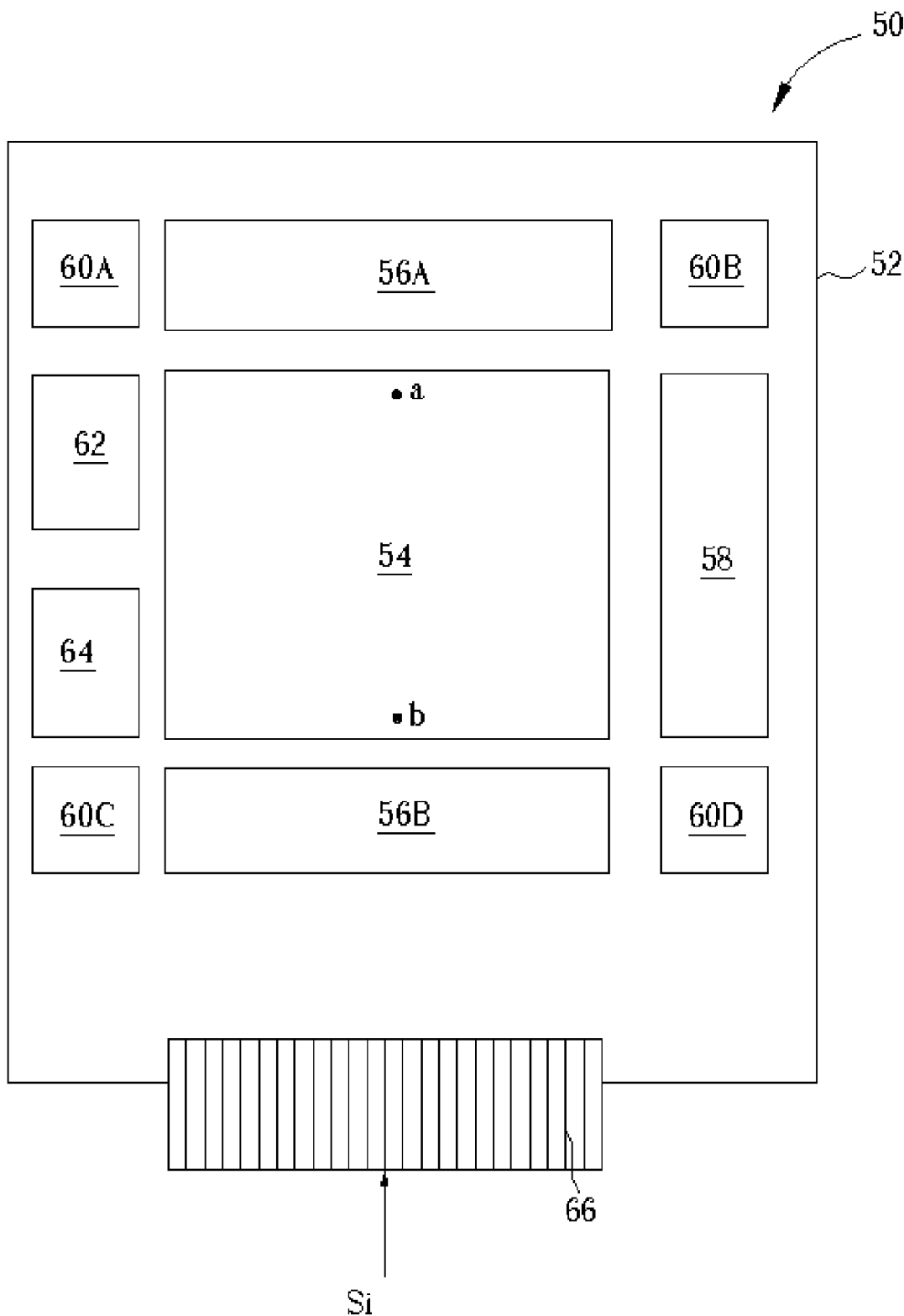
FIG. 3 is a schematic diagram of a polysilicon thin film transistor liquid crystal display of the present invention.

Refer to FIG. 3, which is schematic diagram of a polysilicon thin film transistor liquid crystal display 50 of the present invention. Similar to the conventional polysilicon thin film transistor liquid crystal display 10, the polysilicon thin film transistor liquid crystal display 50 comprises a panel 52 having related logic circuits and interface circuits formed therein, a pixel region 54, a first data line driver 56A, a second data line driver 56B, a scan line driver 58, a plurality of common voltage drivers 60A–60D, a timing control circuit 62, an interface circuit 64, and a connecting component 66. The pixel region 54, the first data line driver 56A, the second data line driver 56B, the scan line driver 58, the common voltage drivers 60A–60D, the timing control circuit 62, and the interface circuit 64 are formed in the panel 52 in the form of polysilicon thin film transistors.

A key difference of the present invention compared to the prior art is that the polysilicon thin film transistor liquid crystal display 50 comprises a plurality of common voltage drivers 66A–66D whereas the conventional polysilicon thin film transistor liquid crystal display 10 has only one common voltage driver 20. All the common voltage drivers 60A–60D are used to generate a common voltage Vcom applied to the common electrode of each display cell in the pixel region 54.

Figure 4:
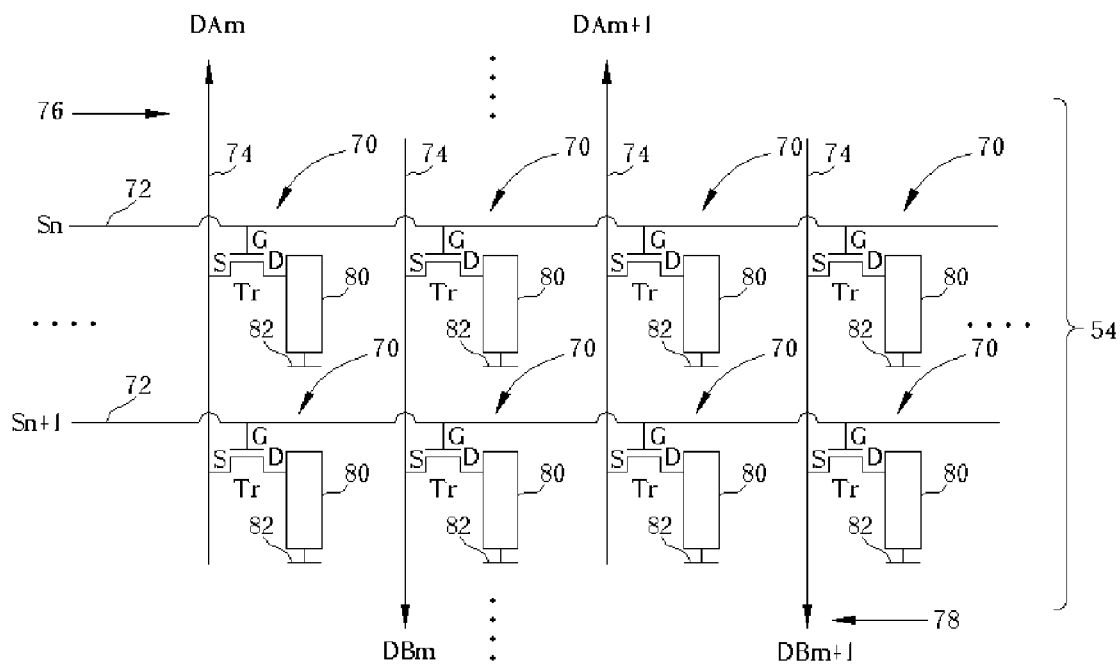
FIG. 4 is a circuit diagram of the pixel region of the polysilicon thin film transistor liquid crystal display shown in FIG. 3.

Refer to FIG. 3 and FIG. 4. FIG. 4 is a circuit diagram of the pixel region 54 of the polysilicon thin film transistor liquid crystal display 50 shown in FIG. 3. As shown in FIG. 3, an image signal Si is transmitted to the polysilicon thin film transistor liquid crystal display 50 via the connecting component 66, and transferred to related logic circuits via the interface circuit 64, such that corresponding images are displayed in the pixel region 54. In addition as shown in FIG. 4, the pixel region 54 comprises a plurality of display cells 70. Each display cell, being a pixel or a sub-pixel, comprises a polysilicon TFT Tr and a liquid crystal component 80. The liquid crystal component 80 is able to vary its image characteristic under the control of the polysilicon TFT Tr.

Furthermore, the polysilicon thin film transistor liquid crystal display 50 comprises a plurality of scan lines 72 and data lines 74 connected to the display cells 70. The data lines 74 are divided into a first group 76 and a second group 78, wherein the data lines 74 of the first group 76 are connected to the first data line driver 56A, and the data lines 74 of the second group 78, which are arranged alternately to the data lines 74 of the first group 76, are connected to the second data line driver 56B. As shown in FIG. 4, data lines DAm and DAm+1 belong to the first group 76, whereas data lines DBm and DBm+1 belong to the second group 78. The scan lines 72 are coupled to the scan line driver 58 whereby the scan line driver 58 can turn on the polysilicon TFT Tr via the scan lines 72. Therefore, when the polysilicon TFTs Tr are turned on, each liquid crystal component 80 changes its display characteristic according to the voltage of its corresponding data line 74.

Figure 5:
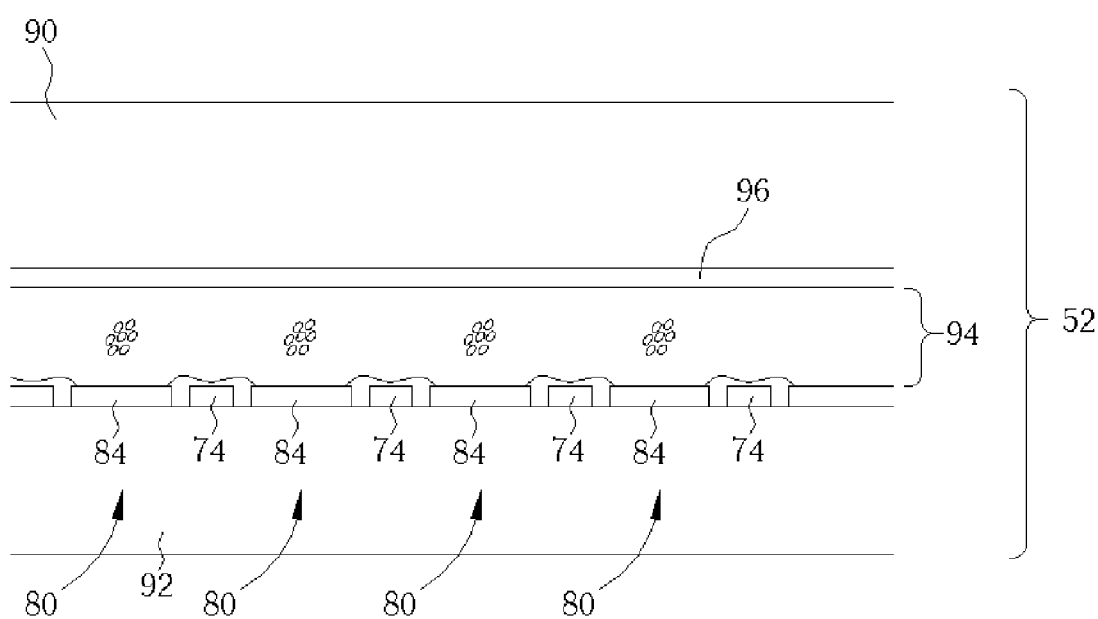
FIG. 5 is a structural diagram of the panel shown in FIG. 3.

Refer to FIG. 4 and FIG. 5. FIG. 5 is a structural diagram of the panel 52 shown in FIG. 3. The panel 52 comprises a top substrate 90, a bottom substrate 92, and a liquid crystal molecule layer 94 located between the top substrate 90 and the bottom substrate 92. The panel 52 further comprises a common voltage layer 96 between the top substrate 90 and the liquid crystal molecule layer 94, wherein the common voltage Vcom generated by the common voltage drivers 60A–60D is applied to the common voltage layer 96. Additionally, each liquid crystal component 80 comprises a pixel electrode 84 and a common electrode 82 coupled to the common voltage layer 96. And each polysilicon TFT Tr comprises a gate G electrically connected to corresponding scan line 72, a source S electrically connected to corresponding data line 74, and a drain D electrically connected to the pixel electrode 84 of corresponding liquid crystal component 80.

As discussed, the key difference of the present invention compared to the prior art is that the polysilicon thin film transistor liquid crystal display 50 has a plurality of common voltage drivers 60A–60D whereas the conventional polysilicon thin film transistor liquid crystal display 10 has only one common voltage driver 20. The common voltage drivers 60A–60D are positioned at four corners of the panel 52, and thus, the common voltage Vcom is equally applied to the common voltage layer 96 of the panel 52.

Figure 6:
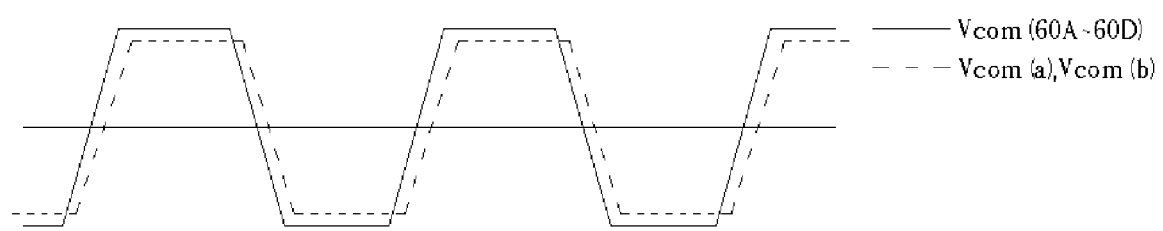
FIG. 6 is a timing diagram of a common voltage Vcom of the polysilicon thin film transistor liquid crystal display shown in FIG. 3.
Figure 7:
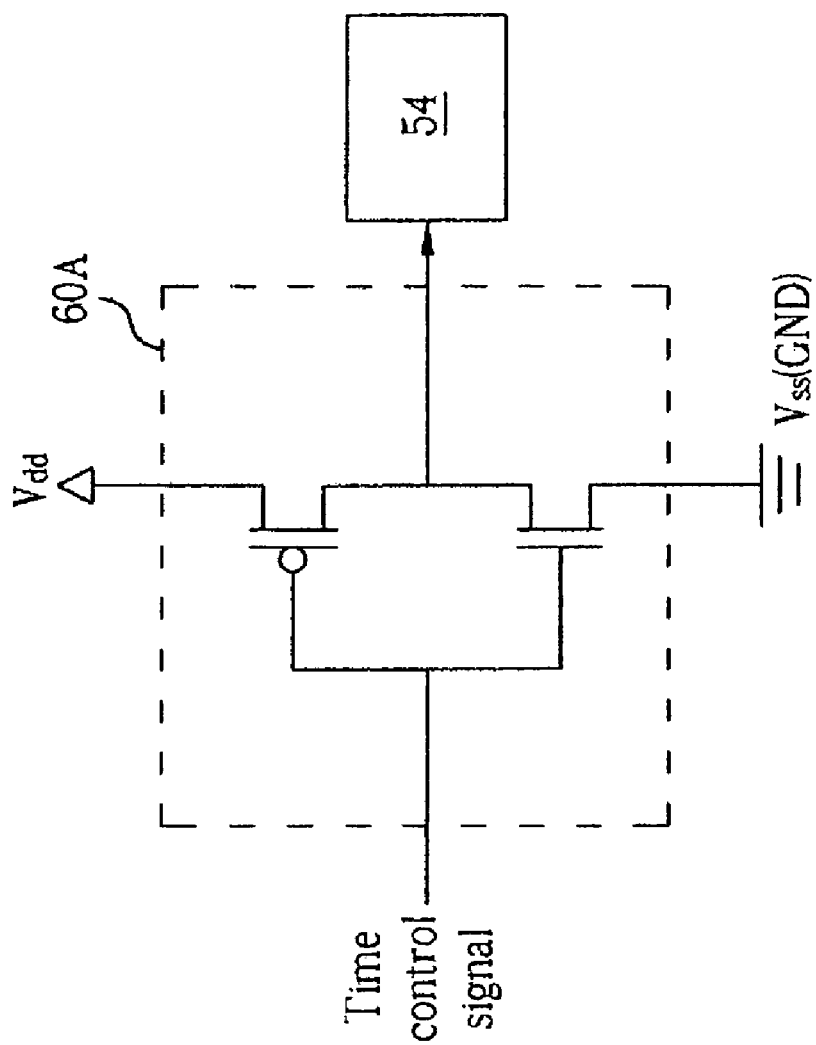
Figure 8:
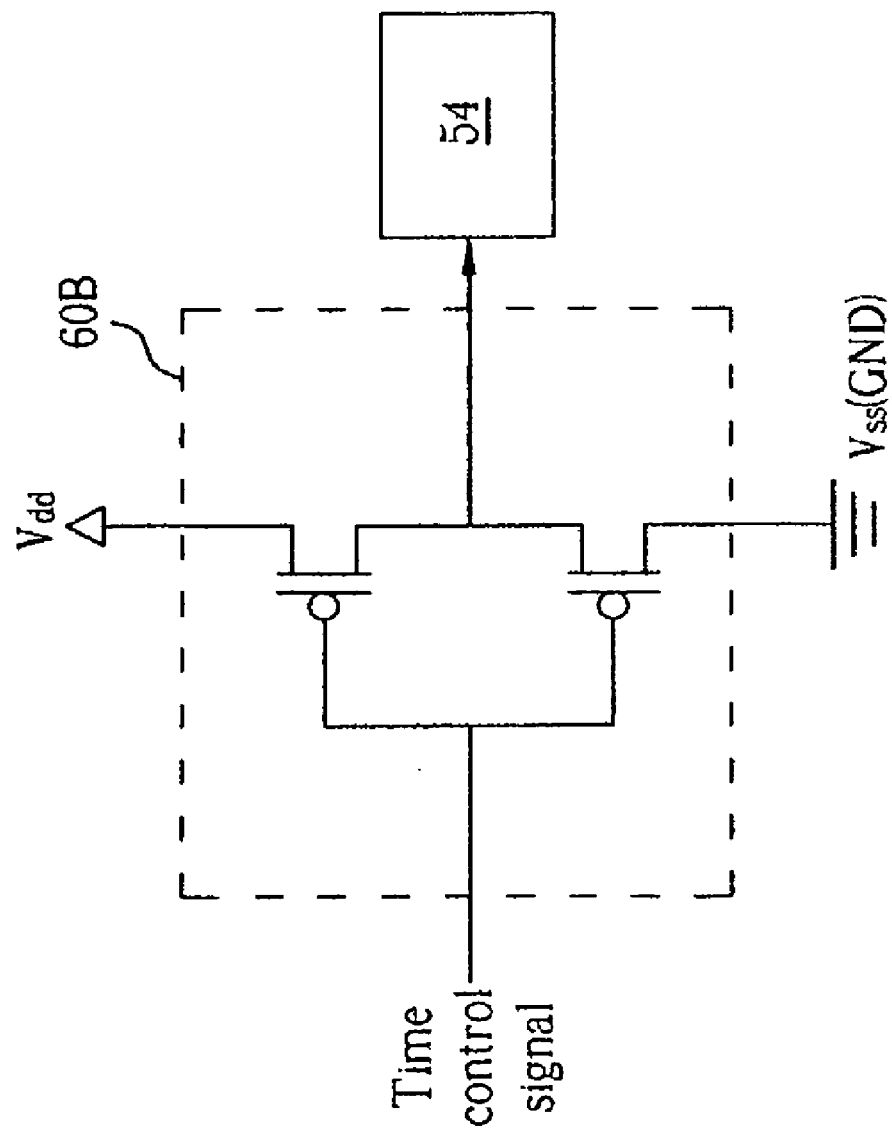
Figure 9:
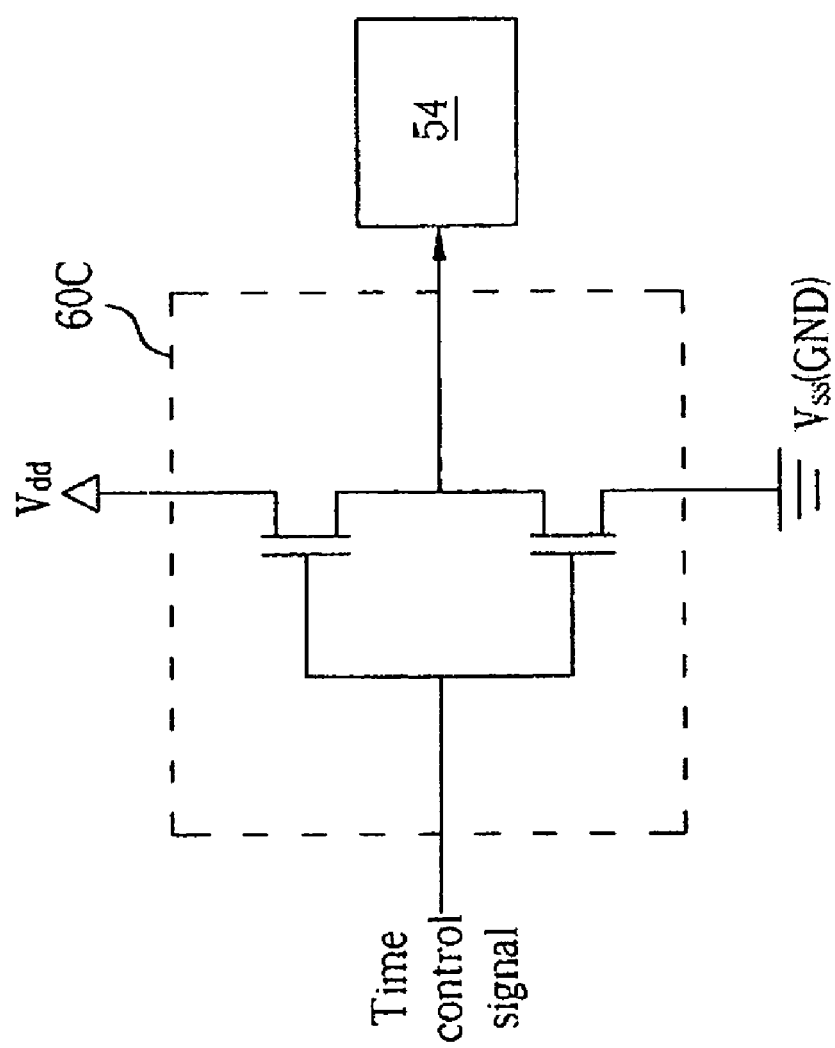

Refer to FIG. 6, which is a timing diagram of common voltage Vcom of the polysilicon thin film transistor liquid crystal display shown in FIG. 3. From top to bottom, FIG. 6 illustrates the waveform of the common voltage Vcom at the common voltage drivers 60A–60D and at points "A" and "B" in the pixel region 54. As shown in FIG. 6, the common voltage is an oscillating voltage applied to the common electrode 82 of each liquid crystal component 80. Since the lengths from point "A" and "B" to the common voltage drivers 60A, 60B, 60C, or 60D are nearly equal, delay and decay due to resistance-capacitance impedance are also equal. Therefore, the waveforms of Vcom at point "A" and point "B" are nearly overlapping, which leads to a better display quality. In addition, since the distances from each display cell 70 to its corresponding common voltage driver 60A, 60B, 60C, or 60D are shorter in the present invention, the delay time is also reduced, and the clock skew situation is further avoided.

It is worth noting that the polysilicon thin film transistor liquid crystal display 50 is merely an embodiment of the present invention, and therefore the quantity of common voltage drivers is not limited. It is preferred for the polysilicon thin film transistor liquid crystal display 50 to have two or more common voltage drivers. In the case where the polysilicon thin film transistor liquid crystal display 50 has two common voltage drivers, the two common voltage drivers can be symmetrically located on both sides of the panel such that uniformity of the common voltage distribution is maintained.

In comparison with the prior art, the polysilicon thin film transistor liquid crystal display of the present invention comprises a plurality of common voltage drivers symmetrically located in the panel whereby the common voltage is equally applied to each common electrode. When the common voltage is an alternating voltage applied in an oscillatory manner, since the delay time of each display cell due to phase delay is reduced, clock skew is reduced.

Those skilled in the art will readily appreciate that numerous modifications and alterations of the device may be made without departing from the scope of the present invention. Accordingly, the above disclosure should be construed as limited only by the metes and bounds of the appended claims.

What is claimed is:

1. A polysilicon thin film transistor liquid crystal display comprising:
   a panel;
   a common voltage layer formed in the panel;
   a plurality of display cells;
   a plurality of scan lines formed in the panel and coupled to the display cells;
   a plurality of data lines formed in the panel and coupled to the display cells; and
   a plurality of common voltage drivers formed in the panel, the common voltage drivers comprising polysilicon thin film transistors, and each common voltage driver being for generating a common voltage applied to the common voltage layer.

2. The polysilicon thin film transistor liquid crystal display of claim 1 wherein the common voltage is an alternating voltage.

3. The polysilicon thin film transistor liquid crystal display of claim 1 further comprising:
   a scan line driver coupled to the plurality of scan lines;
   at least a data line driver coupled to the plurality of data lines; and
   a timing control circuit for generating a timing signal;
   wherein the scan line driver and the data line driver control operations of the display cells based on the timing signal.

4. The polysilicon thin film transistor liquid crystal display of claim 1 further comprising an interface for receiving and transmitting an image signal such that the display cells operate based on the image signal.

5. The polysilicon thin film transistor liquid crystal display of claim 1 wherein each display cell further comprises:
   a liquid crystal component comprising:
      a pixel electrode; and
      a common electrode coupled to the common voltage layer; and
   a polysilicon thin film transistor comprising:
      a gate electrically connected to a corresponding scan line;
      a source electrically connected to a corresponding data line; and
      a drain electrically connected to the pixel electrode of the liquid crystal component.

* * * * *